US010448204B2

(12) United States Patent
Maloney et al.

(10) Patent No.: US 10,448,204 B2
(45) Date of Patent: Oct. 15, 2019

(54) INDIVIDUALIZED PRESENCE CONTEXT PUBLISHING

(71) Applicant: Microsoft Technology Licensing, LLC, Redmond, WA (US)

(72) Inventors: Christopher Scott Maloney, Redmond, WA (US); Francisco O. Blanquicet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/472,112

(22) Filed: Mar. 28, 2017

(65) Prior Publication Data

US 2018/0288567 A1 Oct. 4, 2018

(51) Int. Cl.
*H04W 24/00* (2009.01)
*H04W 4/02* (2018.01)
*H04L 29/08* (2006.01)
*H04W 4/38* (2018.01)

(52) U.S. Cl.
CPC ............ *H04W 4/023* (2013.01); *H04L 67/18* (2013.01); *H04L 67/22* (2013.01); *H04L 67/24* (2013.01); *H04L 67/34* (2013.01); *H04L 67/12* (2013.01); *H04L 67/125* (2013.01); *H04W 4/38* (2018.02)

(58) Field of Classification Search
CPC ........ H04W 4/023; H04L 67/22; H04L 67/24; H04L 67/12
USPC .......................................... 455/456.3; 705/2
See application file for complete search history.

(56) References Cited

U.S. PATENT DOCUMENTS

| | | |
|---|---|---|
| 7,100,116 B1 | 8/2006 | Shafrir et al. |
| 9,258,376 B2 | 2/2016 | Jensen |
| 9,497,594 B2 | 11/2016 | Xie et al. |
| 2002/0116461 A1 | 8/2002 | Diacakis et al. |
| 2002/0147931 A1 | 10/2002 | Liu |
| 2005/0182962 A1 | 8/2005 | Given et al. |
| 2006/0190117 A1 | 8/2006 | Weczorek et al. |
| 2010/0262430 A1* | 10/2010 | Gips ............... G06Q 50/22 705/2 |
| 2010/0299615 A1 | 11/2010 | Miluzzo et al. |
| 2013/0191319 A1 | 7/2013 | Biehl et al. |
| 2013/0346084 A1 | 12/2013 | Archambault et al. |
| 2014/0347188 A1 | 11/2014 | Alameh et al. |
| 2015/0121108 A1 | 4/2015 | Agrawal et al. |
| 2016/0157780 A1 | 6/2016 | Rimminen et al. |

OTHER PUBLICATIONS

Antonic, et al., "Inferring Presence Status on Smartphones: The Big Data Perspective", In Proceedings of IEEE Symposium on Computers and Communications, Jul. 7, 2013, 6 pages.

* cited by examiner

*Primary Examiner* — Charles T Shedrick
(74) *Attorney, Agent, or Firm* — Newport IP, LLC; Han Gim

(57) ABSTRACT

Techniques for providing status information for a user are described. Data indicative of a physical status of a user, device usage of the user, and contextual information are received. The data is analyzed and a probable status of the user relative to a predetermined location is determined. The probable status is determined in part as a function of availability of the data. The probable status is sent to a interface device for presentation of the probable status.

20 Claims, 5 Drawing Sheets

INDIVIDUALIZED PRESENCE CONTEXT PUBLISHING

BACKGROUND

Networks such as IoT networks may include physical devices or user equipment embedded with electronics, sensors, software and network connectivity and that are able to collect and exchange information with one another. Such networks allow for collection of data relating to a user, facilitating an understanding of a user's environment and behavior.

SUMMARY

Methods and systems for determining status information of a user are disclosed. The status information is usable by other users and systems to, for example, determine whether the user is available for communications, or to adjust or deactivate functions based on the user's status so as to reduce resource consumption. Data indicative of a physical status of a user may be received from one or more sensors. Data indicative of the user's device usage may be received from one or more computing devices. Additionally, contextual information may be received. The received data may be analyzed and a probable status of the user relative to a predetermined location may be determined. The probable status may be sent to at least one interface device for presentation of the user status.

The features, functions, and advantages can be achieved independently in various embodiments or may be combined in yet other embodiments, further details of which can be seen with reference to the following description and illustrations.

DETAILED DESCRIPTION

Figure 1:
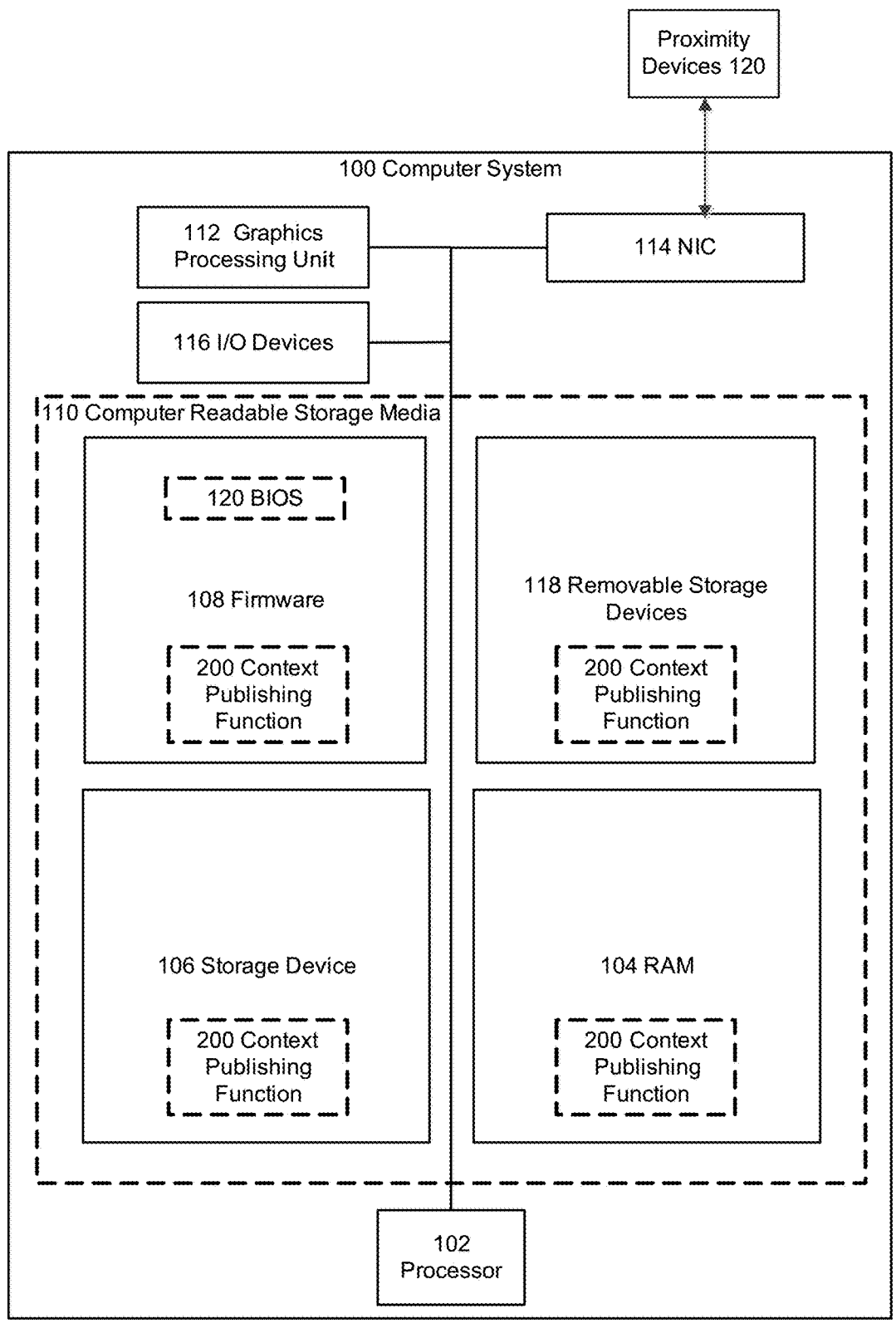
FIG. 1 is a system diagram of an example computer environment, in accordance with an embodiment.

This disclosure describes techniques and systems for determining and publishing a context of a user to a number of destinations. The techniques and systems may be implemented in the context of an interconnected network, such as an Internet of Things (IoT) network that may be coupled to computing devices as well as sensors and other devices located throughout a home, office, or other environment. The devices may include lighting and other controllers that can provide context information. The sensors can include luminosity sensors and proximity sensors, for example. The user's computing device may also provide indications of the user's status with respect to usage of the computing device and functions running on the computing device.

A system connected to the network may be configured to receive information from the user's computing device, the sensors, and other devices. The system may be configured to determine a user's context and status. The user's status may then be made available to other devices. For example, the user's status can be displayed on a connected user interface device at the user's office, or the status can be provided to authorized devices on the network. The system may be configured to use inference logic to infer the user's presence status from both the user's computing device, available sensors, and other information. Sensor information may include light patterns and movement patterns. Devices that provide context information may include lighting controllers, thermostat controllers, entertainment devices, and other devices that may be useful to infer whether a user is present. User device information may include application activity, keyboard activity, touchpad activity, etc. The inference logic may execute on a device on the network such as the device displaying the user's status, or a device can monitor status of multiple users in the network.

In an embodiment, a context publishing function may be implemented on one or more devices of an interconnected network such as an Internet of Things (IoT) network. The context publishing function may reside on a device, which in some embodiments may be a IoT headless device that has no user interface. The network may also be connected to functions and applications that provide communications services such as video and voice call services, as well as other functions and applications that may be configured to determine a user's status with respect to an online presence or online activity.

In conjunction with sensor and device data, the context publishing function may determine or infer a most likely user presence status. For example, a luminosity sensor may detect light or absence of light within an expected location of the user such as in the user's office. A proximity sensor may detect movement of the user in the expected location. Other types of sensors may provide data such as sound detectors, cameras, voice recognition, and pattern recognition devices. Controller devices, such as a lighting controller, may provide contextual information that indicates that a user is nearby or present. For example, if an office light is on, then it may be inferred that the user is likely in the office. This may be particularly relevant if the light controller is controlled by movement of the user (e.g., the light controller is configured to turn the lights off if no movement is detected for a predetermined time period). Other devices that may provide context information may include, for example, audio or video entertainment devices, which may indicate that the user is actively consuming media, or a thermostat, which may indicate that the user has activated a heating or cooling setting that may indicate that the user is present in the environment.

Based on such device and sensor data, the context publishing function may infer presence and movement of the user.

The context publishing function may further be in communication with devices that may be used to published or make known the status of the user. For example, an LCD display may be provided in the vicinity of the user's expected location such as outside the user's office. Such a device may provide a visual representation of the user's presence. For example, the device may cast the user's presence, either physical or online or both, to a display device. The display device may be situated in various locations in the user's vicinity or may be situated in another location where such information may be of interest to other users.

In an embodiment, the context publishing function may be implemented as a device that may be located at or near a user's office and receives data from nearby sensors as well as data pertaining to the user's activity on a user device (or lack of activity). Based on this information, the context publishing function may determine if the user is in the office, and also make a determination as to how and when to communicate this information. The presence information may be augmented with additional details such as how long the user has been away or how long the user has been active or in the present location.

The context publishing function may also provide various combinations of presence information such as the "the user is online but not in the office" or "the user is in the office but not online." The user's online presence information may be determined, for example, using one or more agents that run locally on the user's device, or may run elsewhere such as on a remote device or in the cloud, and determine the online presence information using data provided by the agent.

The user presence information may be subject to user preferences for how and when to provide and publish the presence information. The user presence information may also be subject to various rules and regulations pertaining to privacy, security, and other factors.

The context publishing function may include various levels of complexity based on the available sensor and online information. The context publishing function may maintain the user's presence information and update the presence continuously or as new information is becomes available. The user's presence information may be persisted and made available to requesting systems or published to various destinations.

In one embodiment, an interconnected network may be coupled to one or more user computing devices as well as data sources such as sensors and computing devices located throughout a home or office environment. At least one of the devices may provide the context publishing function. The sensors can include luminosity sensors, passive infrared (IR) sensors, cameras with image recognition, depth sensors, and the like. The computing devices can be any other device that may be operable to interact on the interconnected network. Based on the data from the data sources, the context publishing function may make a determination as to a user's physical presence relative to the context publishing function, to the user's normally used computing device, or some other location. The context publishing function may be configured to determine the user's presence based on the user's position and online activity that meets one or more criteria or one or more rules. For example, the context publishing function may determine that a user is physically present when the user is detected to be within a specified radius from a specified location, such as 3 feet or 5 feet.

In another example, the context publishing function may include inference logic may be used to infer the user's presence status from the user's computing device, other computing devices, and available sensors. Sensor information may include light patterns and movement patterns, and user device information may include Bluetooth connectivity status, computing device activity or non-activity, and the like. The inference logic of the context publishing function may execute on a device on the local network.

By providing a more comprehensive user presence indication based on both online presence and sensed physical presence, more detailed and nuanced presence information may be provided to other users. The presence information may also be provided to other systems and devices, allowing for individualized services based on the user's presence information. For example, system resource consumption and power consumption may be reduced by automatically reducing or turning off various functions based on user presence. For example, various powered systems may be allowed to enter a sleeping or low power mode when it is determined that the user is not physically present, and predetermined automated responses may be provided in response to messages received when the user is determined to be out of the office and when their online presence is not established.

Various sensors and devices may be used to directly or indirectly provide user presence information. For example, passive infrared (IR) devices may be used to detect motion to infer the presence of a user. A camera may provide data and image recognition may be used to determine that a user is within an estimated proximity of the device. Depth sensors along with color sensors can be used to detect how far a user is from the device.

Additionally, the user's presence may be inferred based on secondary or non-direct information. For example, the presence of a user device such as a key fob or a smartphone can be used to infer that the user is within an estimated proximity to the user's normal office or work location. The presence of the user may be inferred using information such as the Bluetooth connection for the user becoming disconnected, suggesting that the user has left the room and is of a sufficient distance so as to disconnect from the Bluetooth transceiver of a locally situated device. Other secondary information may include, for example, sensors that detect door opening and closing, heat sensors, and self-reported location information from a user's mobile device.

In some embodiments, the context publishing function may be configured with a default set of parameters for when the user presence features are allowed. Such parameters may include a time period where the user presence features are to be in effect. In some embodiments, the user may be provided the ability to select options for the user presence parameters. For example, the user may specify a radius or geo-fence in which the user's presence may be detected.

In another example, the user may select an option to turn off the context publishing function completely, for example if the room will have numerous occupants and the context publishing features should be disabled. In some embodiments, active operations for enabling context publishing features may be limited to time periods and/or locations based on a profile configured by the user. For example, operations may be limited or disabled during night hours, or at identified locations, such as an outdoor location or garage.

In some embodiments, active operations for enabling context publishing features may include determining a state of the user's mobile device or other device. The state may, in some examples, refer to a change in the device's state of motion associated with a change in the computing device's location over time. The state may be determined by monitoring existing signals of the device, and/or location data generated by applications on the device. Such existing signals and location data may include signals that indirectly or directly suggest a state of the device.

In general, the accuracy of a determined state or presence of a user may have an associated uncertainty, and the determined state or presence may be assigned a score or metric. The score or metric may quantify a likelihood that the determined or location state represents the actual presence state of the user.

In an embodiment, the determination of the user's location and presence state may be determined using an inferred or deduced set of conditions and a set of rules. In one embodiment, a set of conditions may be used to determine an estimated presence state of a user. In response, the set of conditions as well as other information may be collected and analyzed to determine that the presence state and whether the state should be published. One or more rules can be used to make either or both determinations.

In some embodiments, determining that the context publishing function should be enabled may be determined based on the number of persons in a room or area.

In some embodiments, the context publishing function may provide a notification regarding whether the context publishing features are allowed and whether a user's presence was determined. The notifications can be stored locally for future reference, sent periodically or at a schedule to the user's device or another device, or a status may be provided on the device itself such as providing a visual notification, illuminating a light, providing an audio indication, or some other form of notification.

In some embodiments, the context publishing function may be configured to adapt to the specific behavior patterns of the user. For example, if it is observed that the presence of the user has not been detected during the same time period on a daily basis for several weeks, the voice activated device may require a stronger or weaker indication of presence in order to determine the presence state of a user. In some embodiments, the context publishing function may be configured to modify conditions and rules for determining the presence of a user based on feedback using aspects of machine learning, thus allowing for the determinations and actions to be improved over time.

In some embodiments, the context publishing function may be executed as a function on the user's computing device, on another device such as an IoT device, any other computing device in communication with the context publishing function, or a combination. Additionally, some context publishing functionality may execute as a cloud-based service. The device providing the context publishing function can be integrated with a home network or other network and configured to obtain data that indicates the status of various sensors and home devices.

Referring to FIG. 1, an example computing environment in which embodiments of the present disclosure may be implemented is depicted and generally referenced as computing system 100. As utilized herein, the phrase "computing system" generally refers to a computing device with processing power and storage memory, which supports operating software that underlies the execution of software, applications, and computer programs thereon.

As shown by FIG. 1, computing system 100 includes processor 102 (e.g., an execution core) that is interconnected by one or more system buses that couple various system components to processor 102. While one processor 102 is shown in the example depicted by FIG. 1, one skilled in the art will recognize that computing system 100 may have multiple processors (e.g., multiple execution cores per processor substrate and/or multiple processor substrates each having multiple execution cores) that each receive computer-readable instructions and process them accordingly. The one or more system buses may be any of several types of bus structures including a memory bus or memory controller, a peripheral bus, and a local bus using any of a variety of bus architectures. In an embodiment, computing system 100 also includes a host adapter, Small Computer System Interface (SCSI) bus, and an external storage device connected to the SCSI bus.

Computing system 100 also typically includes or has access to various computer-readable media. Computer-readable media is any available media accessible to computing system 100 that embodies computer-readable, processor-executable instructions. By way of example, and not limitation, computer-readable media includes computer-readable storage media 110 and communication media. Aspects of the present disclosure are implemented by way of computer-readable, processor-executable instructions that are stored on or transmitted across some form of computer-readable media.

Communication media typically embodies computer-readable instructions, data structures, program modules or other data in a modulated data signal such as a carrier wave or other transport mechanism and includes any information delivery media. "Modulated data signal", as used herein, refers to a signal having one or more characteristics that each may be configured or modified to encode data into the signal for propagation through a communication channel. Examples of such communication channels include wired media such as a wired network or direct-wired connection, and wireless media such as acoustic, RF, infrared and other wireless media.

Computer-readable storage media 110 can include, for example, random access memory ("RAM") 104; storage device 106 (e.g., electromechanical hard drive, solid state hard drive, etc.); firmware 108 (e.g., FLASH RAM or ROM); and removable storage devices 118 (e.g. CD-ROMs, floppy disks, DVDs, FLASH drives, external storage devices, etc). It should be appreciated by those skilled in the art that other types of computer-readable storage media can be used such as magnetic cassettes, flash memory cards, and/or digital video disks. Generally, such computer-readable storage media can be used in some embodiments to store processor executable instructions tangibly embodying aspects of the present disclosure. Consequently, computer-readable storage media explicitly excludes signals per se.

Computer-readable storage media 110 can provide non-volatile and/or volatile storage of computer-readable, processor-executable instructions, data structures, program modules and other data for computing system 100. A basic input/output system ('BIOS") 120, containing the basic routines that help to transfer information between elements within computing system 100, such as during start up, can be stored in firmware 108. A number of programs may be stored on firmware 108, storage device 106, RAM 104, and/or removable storage devices 118. These programs can include an operating system and/or application programs. In a specific embodiment, computer-readable storage media 110 of a computing system 100 can store context publishing function 200, which is described in more detail in the following paragraphs. In this example embodiment, context publishing function 200 can be executed by processor 102 thereby transforming computing system 100 into a computer environment configured for a specific purpose, i.e., a computer environment configured according to techniques described in this disclosure.

With continued reference to FIG. 1, commands and information may be received by computing system 100 through input/output devices ("I/O devices") 116. I/O devices 116 include one or more input devices, output devices, or a combination thereof. Examples of input devices include a keyboard, a pointing device, a touchpad, a touchscreen, a scanner, a microphone, a joystick, and the like. Examples of output devices include a display device, an audio device (e.g. speakers), a printer, and the like. These and other I/O devices are often connected to processor 102 through a serial port interface that is coupled to the system bus, but may be connected by other interfaces, such as a parallel port, game port, or universal serial bus (USB). A display device can also be connected to the system bus via an interface, such as a video adapter which can be part of, or connected to, a graphics processor unit.

Computing system 100 may operate in a networked environment and receive commands and information from one or more remote computers via logical connections to the one or more remote computers, such as a remote computer. The remote computer may be another computer, a server, a router, a network PC, a peer device or other common network node, and typically can include many or all of the elements described above relative to computing system 100.

When used in a LAN or WAN networking environment, computing system 100 can be connected to the LAN or WAN through network interface card ("NIC") 114. NIC 114, which may be internal or external, can be connected to the system bus. In a networked environment, program modules depicted relative to computing system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
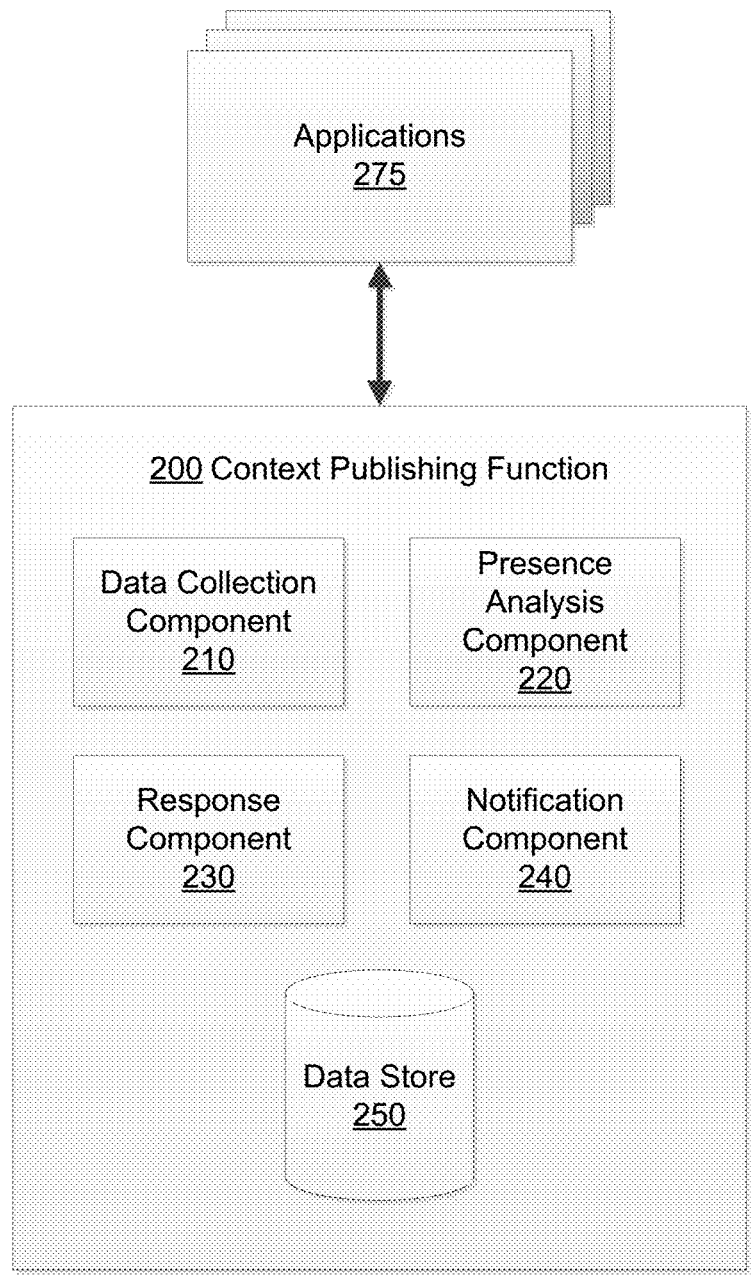
FIG. 2 is a block diagram of an example user presence function, in accordance with an embodiment.

In a networked environment, program modules depicted relative to computing system 100, or portions thereof, may be stored in a remote memory storage device accessible via NIC 114. It will be appreciated that the network connections shown are exemplary and other means of establishing a communications link between the computers may be used. In an embodiment where computing system 100 is configured to operate in a networked environment, the operating system is stored remotely on a network, and computing system 100 may netboot this remotely-stored operating system rather than booting from a locally-stored operating system. In an embodiment, computing system 100 comprises a thin client having an operating system that is less than a full operating system, but rather a kernel that is configured to handle networking and display output. FIG. 2 also shows other devices 120 which may include sensors and other devices that may provide data from which the proximity of a user may be determined.

Turning now to FIG. 2 is a block diagram illustrating an example context publishing function 200 suitable for implementing user location and presence determinations, in accordance with one or more embodiments. In an embodiment, context publishing function 200 may be implemented on a single computing device, such as computing system 100 of FIG. 1. Context publishing function 200 may take on any of a variety of forms. By way of example, computer system 100 may be a mobile telephone, smart phone, laptop computing device, desktop computing device, server, tablet computer, personal digital assistant (PDA), a wearable computer, a gaming device, or any other computing device.

In an embodiment, context publishing function 200 may be implemented on a single computing device, by multiple computing devices, such as computing system 100 of FIG. 1, and in some embodiments at least one server component or a computing component accessed via a network connection (e.g., a cellular network, a WiFi/broadband network, a local area network, and the like). The at least one server component may comprise a single computing device or multiple computing devices cooperating in a distributed environment. For example, the at least one server component may be provided via multiple computing devices arranged in a distributed environment that collectively provide one or more of the functionalities described herein.

As shown by FIG. 2, context publishing function 200 includes such components as data collection component 210, context publishing function 220, response component 230, notifications component 240, and data store 250. Data collection component 210 may be generally responsible for receiving (acquiring, obtaining, or accessing) signals and/or data from one or more sources such as sensors and other devices. In an embodiment, the signals may be passive or active signals received by data collection component 210 and stored in one or more data stores, such as data store 250. The one or more data stores may thus be available to context publishing function 220, response component 230, and notification component 240.

Passive and active signals may be received from a variety of sources. By way of example, passive signals may include state data for a user's device, network connection data, application activity data, inertial data (e.g., accelerometer, gyroscopes, and magnetic field sensors), GPS data, and the like. In an embodiment, any type of existing signal is usable as a passive signal as long as it increases or decreases a likelihood of determining a state or presence of one or more users. Device state data may include user interaction with the computing device, receiving tracking status events from a hardware offloaded (low power) tracking engine, and the like.

Network connection data may include information, such as whether the computing device is paired with a Bluetooth system, wireless access point connections, variations in a number of visible wireless access points (e.g., Wifi basic service set identifiers), signal strength measurements (e.g., received signal strength indicator values) associated with visible wireless access points, and the like. Application activity data may include information, such as whether a user is capturing image data with a camera of the computing device, credit card or other payment transactions completed with the computing device (e.g., an near field communication "NFC" tap), completion of a navigation session associated with a mapping application, receiving geo-fence events for geo-fences set by other applications (e.g., applications 275), and the like.

Passive signals may also include derived data. As another example of a raw system signal that can be used as a passive signal includes: "user is active on the device". In an embodiment, some derived signals may be a stronger indication that a computing device is in a present state (the user is in the room) than raw signals. As used herein, "derived data" refers to data indicative of a state of a computing device that is derived from other passive signals. For example, derived data may include position and velocity data associated with the computing device that is derived from GPS positions opportunistically obtained from unrelated applications (e.g., applications 275), system activity, and the like. As another example, derivative data may include inertial data derived based on recent location determinations.

By way of example, active signals may include data that is actively solicited, requested, or generated specifically for system 200.

Context publishing function 220 may be configured to determine scores (or metrics) for user states and positions based on the passive and active signals as well as other information. For example, context publishing function 220 may use as input statistical information associated with the passive and active signals. Furthermore, context publishing function 220 may determine scores determined for possible user states and positions. The score may indicate a likelihood that an actual state or presence of a user actually corresponds to the determined state or presence.

In an embodiment, a score may be expressed as a percentage, discrete enumeration (e.g., low, high, or unknown), or a combination. Examples of statistical information may include any combination of confidence scores, variance metrics, central tendency values, probability distribution functions, and the like. In determining a score for a user state or presence, context publishing function 220 may receive one or more passive or active signals as input and provide the score for a determined user state or presence as output. The passive or active signals may be received at any level of granularity including: continuously, periodically (e.g., every second, every minute, every ten minutes, etc.), or upon transitioning logic states (e.g., on to off, high to low, etc.).

Subject to design complexity and efficiency constraints, context publishing function 220 may utilize various functions to determine scores for a user state or presence based on passive or active signals. In an embodiment, a score may be determined by taking a weighted average of individual passive or active signals. In an embodiment, a score may be determined in part using actively obtained signals indicative of a user state or presence. In an embodiment, weights may be determined using training data obtained from data sets composed of previously-received passive or active signals. For example, a computing device may run in a test mode in which passive or active signals are collected along with GPS receiver signals providing verified states associated with the passive or active signals. That is, location data may be obtained every N minutes to obtain a ground truth that could be correlated with the passive or active signals to generate training data. In an embodiment, a score may be determined using a custom code implemented in a programming language of choice that defines relationships between individual passive or active signals and an actual state of the computing device.

In an embodiment, any known artificial intelligence, machine learning, knowledge-based, or rule-based mechanisms to train machine learned models that receive passive or active signals as input and provide a score for a user state or presence as an output. Examples of such mechanisms include support vector machines, neural networks, expert systems, Bayesian belief networks, fuzzy logic, data fusion engines, classifiers, and the like. In training the machine learned models (e.g. find optimal values of for model parameters), objective functions may be used to measure the performance of the models using a subset of the training data as a function of the model parameters. For example, optimal values of the parameters of a model may be determined by finding a minimum of the objective function.

As another example, multiple iterations of a stochastic gradient descent procedure may be performed to find the optimal values of the parameters. In an embodiment, the machine learning model is composed of a single level of linear or non-linear operations. In an embodiment, the machine learning model is a deep network composed of multiple levels of non-linear operations. For example, the machine learning model may be a neural network with one or more hidden layers.

As an example, context publishing function 220 may determine a score for a user state or presence using a logistic function. One skilled in the art will recognize that one property of logistic functions is that for any value of an input (i.e., independent variable) an output value is always within a range of [0,1], which makes logistic functions suitable for probabilistic applications. In this example, context publishing function 220 provides three (Boolean) passive signals as input to a logistic function. The three passive signals of this example are: (i) whether the user in in the room ("room"); (ii) whether the user is stationary ("still"); and (iii) whether the user's computing device is active on a network ("connected"). One skilled in the art will recognize that context publishing function 220 may provide a score based on dozen or even hundreds of passive or active signals. In an embodiment, passive or active signals may be categorized as categorical or continuous.

Context publishing function 220 in this example may provide the three passive signals into the following "user is present" state equation to determine a score for the "user is present" state:

$$P_{present}(\text{room, still, connected}) = \frac{1}{1 + e^{-(0.5*room+still+1.2*connected)}} \quad \text{Equation 1}$$

The "user is present" state equation of this example demonstrates several things. First, in the absence of all three signals (i.e., room=0, still=0, connected=0), a score for the "user is present" state is 0.5. In this example, this 0.5 score for the present state may be used as an "indeterminate" threshold that indicates there is insufficient information available to determine that the user is in a "user is present" state.

Second, the "user is present" state equation of this example also demonstrates that some signals may increase the likelihood that the user is in a given state or presence (i.e., a positive correlation exists), while other passive signals may decrease the likelihood that the user is in a given state or presence (i.e., a negative correlation exists). Here, the "room" and "still" signals increase the likelihood that the user is in a "user is present" state. In contrast, another signal may decrease the likelihood that the user is in the "user is present" state because the user is potentially moving.

Third, individual signals may be weighted to reflect a signal's influence on the score relative to the other signals. Here, the "room" passive signal with a weight of 0.5 is a weaker indicator of the present state than the "still" passive signal with a weight of 1. Also, the "connected" signal with a weight of 1.2 is a stronger indication that the user is in a "user is present" state than the "still" passive signal with a weight of +1 that the user is in a present state.

Context publishing function 220 in this example would also provide the three passive signals into a "user is absent" state equation to determine a score for the "user is absent" state. For example, the "user is absent" state equation may be as simple as:

$$P_{absent}(\text{room,still,connected}) = (1 - P_{present}) \quad \text{Equation 2:}$$

In some instances as in this example, the "user is present" state equation and the "user is absent" state equation may both return a low score, which indicates that the scores for the "user is present" state and "user is absent" state have each failed to exceed their respective "indeterminate" thresholds. In these instances, system 200 may be unable to determine the current state of the user. For example, this may occur in situations with limited data availability. After a predetermined period of time in this uncertain state, system 200 may transition to an "unknown" state.

Response component 230 is generally configured to determine actions in response to the state or presence of the user as determined by context publishing function 220 of system 200. Response component 230 may initiate a system action within a predefined time period. In an embodiment, the active operations may result in sending control signals to one or more subsystems of the voice activated device in order to enable or disable voice activation. The action implemented by response component 230 may further provide notifications to one or more other devices.

In an embodiment, system 200 may be configured to limit actions to certain types, such as only allowing notification operations, or allowing actions only for a limited set of states, in order to better control the responses to those that are appropriate for the circumstances or in accordance with the user's preferences.

As discussed above, user state or presence determinations have an associated uncertainty. Response component 230 may modify system actions by categorizing actions based on state scores and probabilities. For example, response component 230 may specify an action for states associated with higher state scores when there is also a higher likelihood that active operations will result in confirming the computing device is in a "present" state.

As another example, response component 230 may specify an action for states associated with specified characteristics. By doing so, response component 230 may reserve a portion of the system action to states associated with locations that are more important for the user like the user's home or office. As another example, response component 230 may specify an action for states associated with lower state scores when there is a lower likelihood that active operations will result in confirming the user is in a present state.

In an embodiment, response component 230 may implement a hierarchy among the potential actions based on state scores, user preferences, probabilities, or a combination thereof. Using this hierarchy, response component 230 may facilitate actions based on various confidence levels.

In an embodiment, response component 230 may be further configured to dynamically adjust actions using user state information. Examples of such current system state information include whether the user's device is in an off state, whether the user's device has a display screen, characteristics of certain applications, etc.

Notification component 240 may be generally configured to provide one or more applications executing on the user's computing device with user state related notifications. In an embodiment, notification component 240 may be implemented using an application programming interface. In cooperation with context publishing function 220, notification component 240 may provide other applications with notifications upon determining the user has transitioned from one state to another. For example, notification component 240 may provide such notifications when the user has entered a present state, exited a present state, or stays in a present state. The notifications may include such information as the user's: current position, device status, number of other persons, and the like. In an embodiment, notification component 240 may issue notifications to applications upon determining that a state score exceeds a predetermined threshold (e.g., 0.7).

Figure 3:
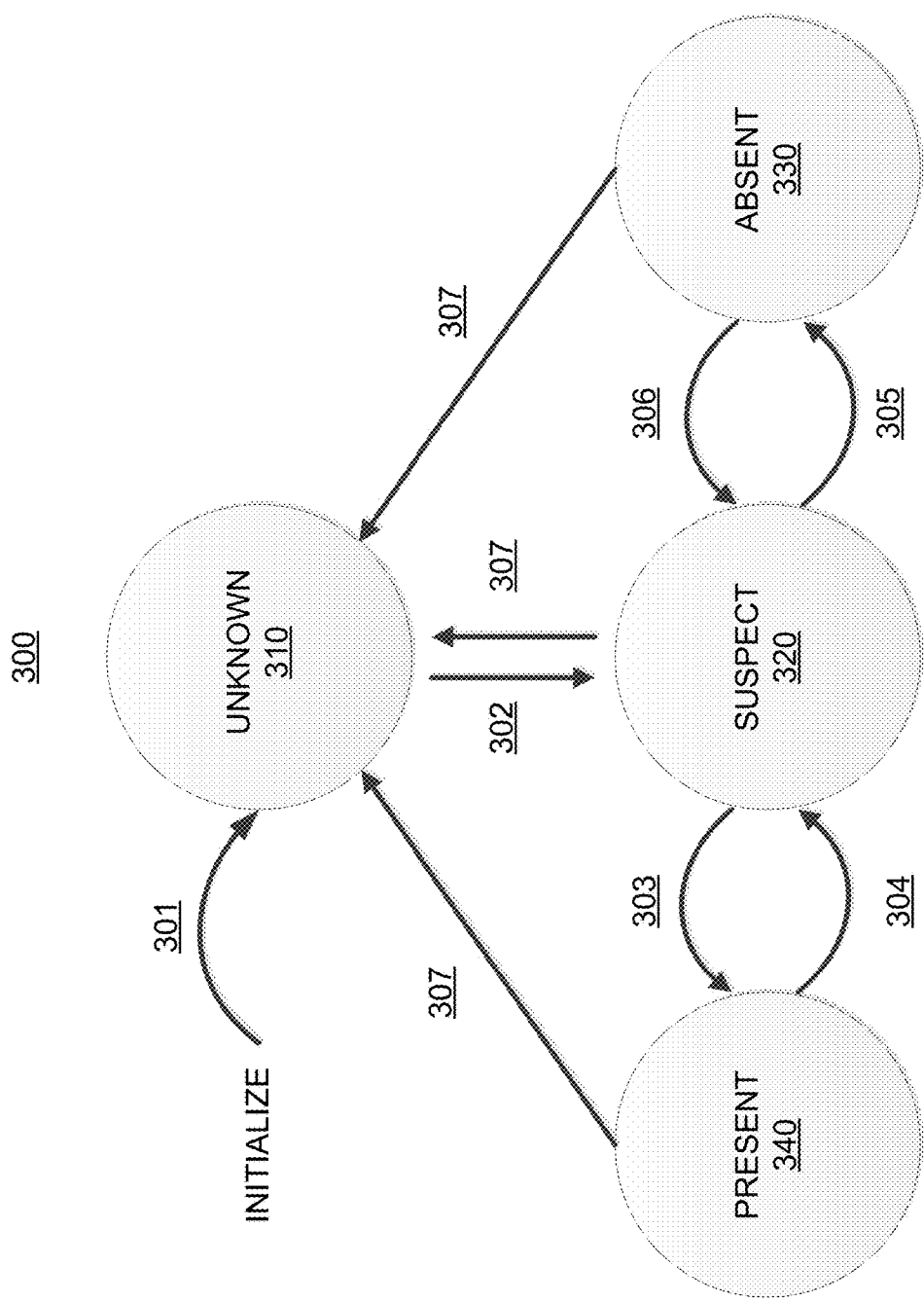
FIG. 3 is a state diagram showing modes of operation of an example computing system and example transitions between modes of operation, in accordance with an embodiment.

FIG. 3 shows a state diagram with four operation modes of an example user state determination system 300 that may be implemented. The four operation modes are an unknown mode 310, a suspect mode 320, an absent mode 330, and a present mode 340. While this example illustrates four operation modes, it should be understood that FIG. 3 only illustrates one example, and that many operation modes or states may be implemented.

In the four operation modes, system 300 may continue to monitor passive or active signals to determine the user's current state. In one embodiment, in the unknown mode 310, system 300 may be mostly idle and does not cause any actions. As indicated by transition 307, system 300 may switch to the unknown mode 310 from any other operation mode when it is unable to determine a current state of the user from passive or active signals. System 300 may also operate in the unknown mode 310 when data is unavailable. One reason that data may be unavailable is system 300 lacks power, or is unable to access a network. When operating in the unknown mode 310, system 300 may periodically (e.g., "every few minutes" or when the passive or active signals start returning probability higher than "undetermined" for another state) switch to the suspect mode 320 to determine the current state, as shown by transition 302.

In suspect mode 320, system 300 may trigger operations to poll for the current state of the user (e.g., by polling a sensor, initiating Bluetooth scans, etc.). For example, if a location of the user has not been determined within a specified time, system 300 may poll for the current state while in suspect mode 320. In an embodiment, system 300 may trigger a subsequent active operation after a predefined time (e.g., 5 minutes) from a first polling operation to poll for data for the user.

If data obtained in suspect mode 320 indicates that the user is in an absent state, system 300 follows transition 303 to absent mode 330. Alternatively, if the data obtained in suspect mode 320 indicates the user is in a present state, system 300 follows transition 305 to present mode 340. As discussed above, system 300 may also follow transition 307 to unknown mode 310 for at least the reasons discussed above.

Figure 4:
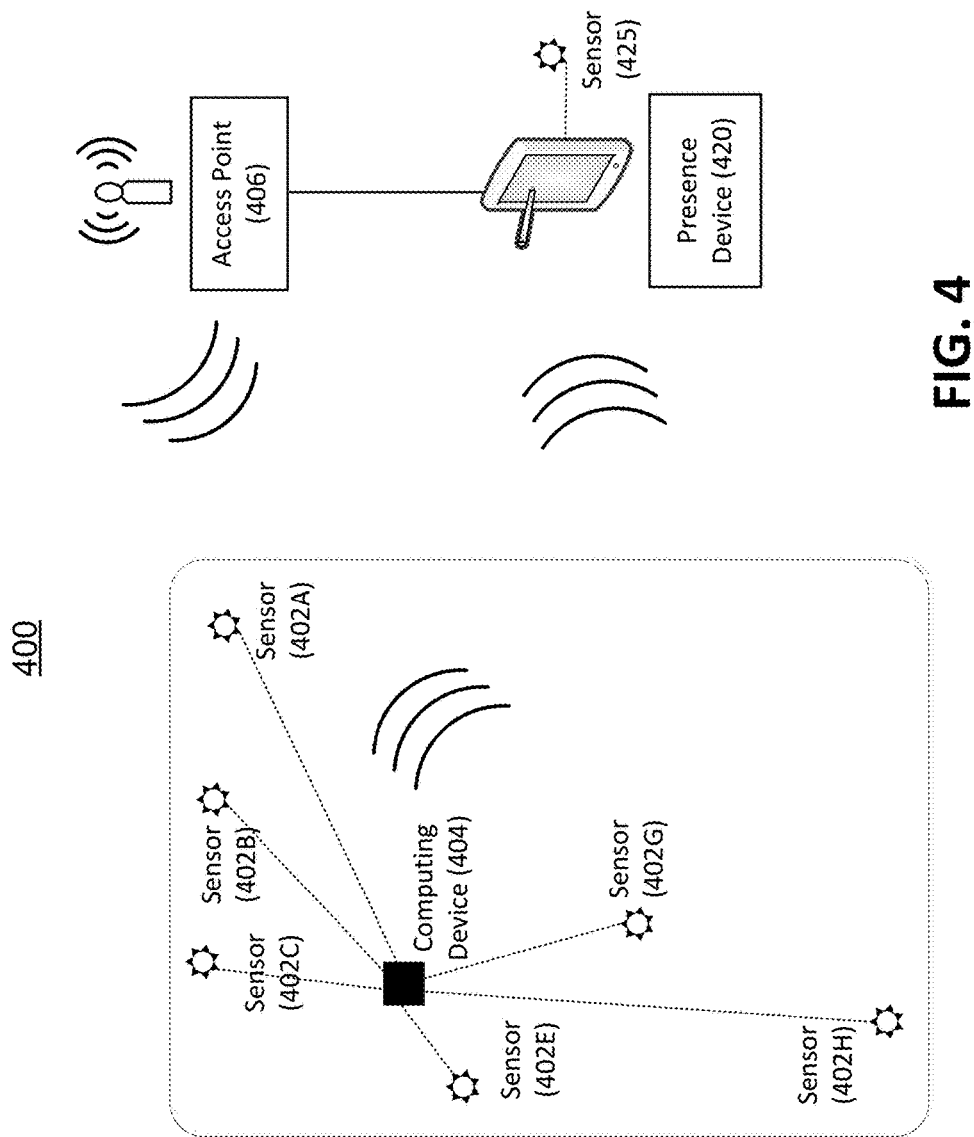
FIG. 4 is an illustration of system that may be used in various embodiments.

Turning to FIG. 4, an example of context publishing system 400 is illustrated. The context publishing system 400 may be configured to collect data associated with a user, analyze the collected data, perform one or more actions associated with the user and the user's device, and optionally send notifications to the presence device 420. In an embodiment, the context publishing system 400 may include or have access to a number of devices 402A-H (which may be referred herein singularly as "device 402" or in the plural as "devices 402") connected to a computing device 404. The devices 402 are configured to measure or otherwise obtain data indicative of various subsystems and components to the computing device 404, which in turn, processes and transmits information to and receives information from the presence device 420. FIG. 4 also shows that the presence device 420 may also have a device 425 that is installed on or coupled to the device.

Each of the devices 402 and 425 may typically be installed in various locations in or near a home, office, or other location proximate to the voice activated device. Although FIG. 4 shows six devices 402 located in various positions, this number can be larger or smaller depending on the size and purpose of the context publishing system 400.

The computing device 404 of the context publishing system 400 may interface with the presence device 420 by way of the access point 406, which may be any wireless access point utilizing technologies such as cellular and Wifi. However, in an example, an intermediary device can also be used. The presence device 420 may be a standalone device with or without a user interface, a smartphone, a tablet, or another computing device that is capable of communicating directly with the computing device 404 via, for example, Bluetooth, or communicate with access point 406 to communicate with computing device 404.

Various data can be measured with regard to the user's status. The device 402 can also be implemented as a virtual sensor that combines measurement and functionalities of the various types of sensors and devices. In other embodiments, the device 402 is an interface device can be a device that communicates with and obtains data from a sensor.

In one embodiment, the devices 402 may be configured to transmit the measured data to the computing device 404, which may be configured to process the data. In some embodiments, the computing device 404 may not perform processing and may collect and transmit data to presence device 420, which may in turn execute functionality to process the received data.

In one embodiment, the computing device 404 may add time and location information to the processed data. The time may be measured by way of a clock operated by the computing device 404, while the location may be determined from the measured data or from a location sensor of the computing device 404 (e.g., circuitry that determines coordinates based on global positioning system (GPS), location triangulation techniques, etc.).

Moreover, the computing device 404 may correlate the data (e.g., the time and location stamped, labeled, and categorized data) with a particular detectable or identifiable user. For example, the computing device 404 can receive information that identifies the current user, or may be able to detect or infer the identity of the subject based on sensed data. Identity information can be provided by the presence device 420 or can be locally stored at the computing device 404. For example, the computing device 404 can add an identifier of the user (e.g., name) to the data to allow the presence device 420 to identify the user.

Figure 5:
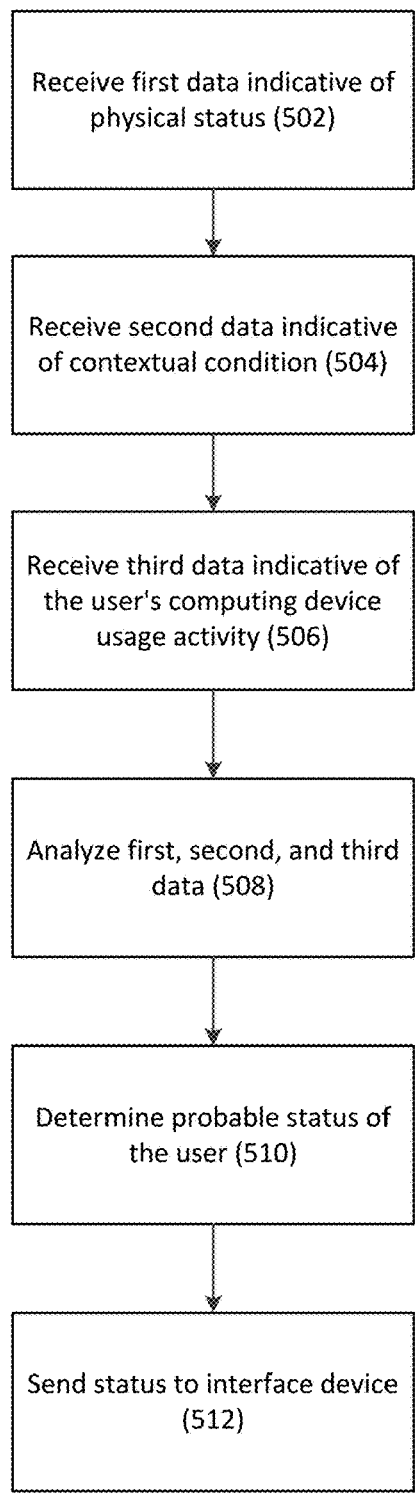
FIG. 5 is a flow diagram showing an example set of operations for determining a user's status.

Turning to FIG. 5, an example operation for providing status information for a user is illustrated. Referring to FIG. 5, operation 502 illustrates receiving, by a computing device from one or more sensors, first data indicative of a physical status of a user. In an embodiment, the first data may be received from one or more IoT devices.

Operation 502 may be followed by operation 504. Operation 504 illustrates receiving, by the computing device from the IoT devices, second data indicative of a contextual condition.

Operation 504 may be followed by operation 506. Operation 506 illustrates receiving, by the computing device, third data indicative of the user's computing device usage activity.

Operation 506 may be followed by operation 508. Operation 508 illustrates analyzing, by the computing device, the received first, second, and third data.

Operation 508 may be followed by operation 508. Operation 510 illustrates based on the analyzing, determining a probable status of the user relative to a predetermined location, the probable status determined in part based on availability of the first, second, and third data.

Operation 510 may be followed by operation 512. Operation 512 illustrates sending the probable status to at least one interface device for presentation of the probable status.

Embodiments of the present disclosure may be implemented as a method for providing status information. The method comprises:

receiving, by a computing device from one or more Internet of Things (IoT) devices, first data indicative of a physical status of a user;

receiving, by the computing device from the IoT devices, second data indicative of a contextual condition;

receiving, by the computing device, third data indicative of the user's computing device usage activity;

analyzing, by the computing device, the received first, second, and third data;

based on the analyzing, determining a probable status of the user relative to a predetermined location, the probable status determined in part based on availability of the first, second, and third data; and sending the probable status to at least one interface device for presentation of the probable status.

In an embodiment, the first data is received from one or more sensors.

In an embodiment, the sensors comprise luminosity sensors and proximity sensors.

In an embodiment, the second data comprises data indicative of a status of a control device, input device, an output device, or a combination.

In an embodiment, the control device, input device, or an output device comprises a lighting control, a microphone, a thermostat control, or an entertainment device.

In an embodiment, the probable status is further based at least in part on one or more rules, one or more user preferences, or a combination.

In an embodiment, the probable status comprises one of a present state, absent state, or an unknown state.

In an embodiment, the one or more rules a rule determines that a predetermined function should be enabled based on the probable status.

In an embodiment, the one or more rules determines that a predetermined function should be enabled based on the probable status and an associated probability of the probable status.

In an embodiment, the third data is indicative of the user's use of a computing device.

In an embodiment, the third data is indicative of an active connection to a specified network.

In an embodiment, the method further comprises sending a notification to an interface device, the notification indicative of the probable status.

In an embodiment, the method further comprises deactivating at least one function based on a change to the probable status.

In an embodiment, the one or more user preferences comprises a time of day when the probable status is to be determined.

In an embodiment, the one or more user preferences comprises a location where the probable status is to be determined.

In an embodiment, the probable status is determined based on a rule-based inference function that receives as input the first, second, and third data.

In an embodiment, the disclosed embodiments may be implemented as a system comprising one or more processors that are configured to execute one or more executable instructions that cause the system to perform operations comprising:

receiving sensor data associated with a predetermined location;

receiving data indicative of a user's device usage;

receiving data indicative of a context associated with the user;

analyzing the received sensor data, data indicative of the user's device usage, and data indicative of the context associated with the user;

based on the analyzing, determining a probable presence status of the user relative to the predetermined location; and sending the user status to at least one interface device for presentation of the user status.

In an embodiment, the one or more processors are configured to execute one or more executable instructions that cause the system to perform operations comprising activating at least function based on a change to the probable presence status.

In an embodiment, the probable presence status is based at least in part on a determined distance from the predetermined location.

In an embodiment, the disclosed embodiments may be implemented as a computing device comprising at least one memory having stored therein computer instructions that, upon execution by one or more processors of the computing device, at least cause the computing device to:

analyzing data received from one or more data sources comprising IoT devices, the data indicative of a user's physical presence, status of a device, device usage associated with the user, or a combination;

based on the analyzing, determining a proximity of the user relative to a predetermined location;

determining a user status based at least in part on the determined proximity and one or more criteria; and sending the user status to at least one interface device for presentation of the user status.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium. The terms "circuitry", "component", or "module" are used interchangeably throughout and include hardware components such as hardware interrupt controllers, hard drives, network adaptors, graphics processors, hardware based video/audio codecs, and the firmware used to operate such hardware. The terms "circuitry", "component", or "module" can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s).

In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A method for providing status information, the method comprising:

receiving, by a computing device from one or more Internet of Things (IoT) devices, first data indicative of a physical status of a user;

receiving, by the computing device from the IoT devices, second data indicative of a contextual condition;

receiving, by the computing device, third data indicative of the user's computing device usage activity;

analyzing, by the computing device, the received first, second, and third data;

based on the analyzing, determining a probable status of the user relative to a predetermined location, the probable status probabilistically determined at least in part based on presence and absence of the first, second, and third data and whether the user was absent in relation to the predetermined location for at least a predetermined period of time; and activating or deactivating at least one function based on the probable status, the at least one function comprising at least one of reducing system resource consumption, reducing power consumption, entering a sleeping mode, entering a low power mode, or activating a predetermined automated response to received messages, wherein the at least one function is associated with one or more of the IoT devices.

2. The method of claim 1, wherein the first data is received from one or more sensors.

3. The method of claim 2, wherein the sensors comprise luminosity sensors and proximity sensors.

4. The method of claim 1, wherein the second data comprises data indicative of a status of a control device, input device, an output device, or a combination.

5. The method of claim 4, wherein the control device, input device, or an output device comprises a lighting control, a microphone, a thermostat control, or an entertainment device.

6. The method of claim 1, wherein the probable status is further based at least in part on one or more rules, one or more user preferences, or a combination.

7. The method of claim 1, wherein the probable status comprises one of a present state, absent state, or an unknown state.

8. The method of claim 6, wherein the one or more rules a rule determines that a predetermined function should be enabled based on the probable status.

9. The method of claim 6, wherein the one or more rules determines that a predetermined function should be enabled based on the probable status and an associated probability of the probable status.

10. The method of claim 1, wherein the third data is indicative of the user's use of a computing device.

11. The method of claim 1, wherein the third data is indicative of an active connection to a specified network.

12. The method of claim 1, further comprising sending a notification to an interface device, the notification indicative of the probable status.

13. The method of claim 1, further comprising deactivating at least one function based on a change to the probable status.

14. The method of claim 6, wherein the one or more user preferences comprises a time of day when the probable status is to be determined.

15. The method of claim 6, wherein the one or more user preferences comprises a location where the probable status is to be determined.

16. The method of claim 1, wherein the probable status is determined based on a rule-based inference function that receives as input the first, second, and third data.

17. A system comprising one or more processors that are configured to execute one or more executable instructions that cause the system to perform operations comprising:

receiving sensor data associated with a predetermined location;

receiving data indicative of a user's device usage;

receiving data indicative of a context associated with the user;

analyzing the received sensor data, data indicative of the user's device usage, and data indicative of the context associated with the user;

based on the analyzing, probabilistically determining a probable status of the user relative to the predetermined location, the presence status determined based at least in part on whether the user was absent from the predetermined location for at least a predetermined period of time; and activating or deactivating at least one function based on the probable status, the at least one function comprising at least one of reducing system resource consumption, reducing power consumption, entering a sleeping mode, entering a low power mode, or activating a predetermined automated response to received messages, wherein the at least one function is associated with one or more devices of an IoT network.

18. The system of claim 17, wherein the one or more processors are configured to execute one or more executable instructions that cause the system to perform operations comprising activating at least function based on a change to the presence status.

19. The system of claim 17, wherein the presence status is based at least in part on a determined distance from the predetermined location.

20. A computing device comprising at least one memory having stored therein computer instructions that, upon execution by one or more processors of the computing device, at least cause the computing device to:

analyze data received from one or more data sources comprising IoT devices, the data indicative of a user's physical presence, status of a device, device usage associated with the user, or a combination;

based on the analyzing, determine a proximity or absence of the user relative to a predetermined location for at least a predetermined period of time;

determine a user status based at least in part on the determined proximity or absence and one or more criteria; and enable or disable at least one function based on the user status, the at least one function comprising at least one of reducing system resource consumption, reducing power consumption, entering a sleeping mode, entering a low power mode, or activating a predetermined automated response to received messages, wherein the at least one function is associated with one or more of the IoT devices.

* * * * *